United States Patent Office 3,366,711
Patented Jan. 30, 1968

3,366,711
POLYMERS FOR ACRYLIC FIBERS HAVING IMPROVED DYEABILITY
Corrado Mazzolini, Mestre, Venezia, and Luigi Patron, Venice, Italy, assignors to Monsanto Company, St. Louis, Mo., a corporation of Delaware
No Drawing. Filed May 3, 1966, Ser. No. 547,196
7 Claims. (Cl. 260—898)

ABSTRACT OF THE DISCLOSURE

Basic dyeable acrylic polymers have been prepared through interpolymerization of acrylonitrile, other monoethylenically unsaturated monomers having bulky side groups and additionally small concentrations of sulfocinnamic acid, its alkyl, halogen, hydroxyl and water soluble salt derivatives. Such polymers and blends thereof with other acrylic polymers have been found useful in the preparation of basic dyeable acrylic fibers.

---

This invention relates to novel interpolymers of acrylonitrile and articles of manufacture prepared therefrom having improved basic dyeability. The invention further relates to polymer blends comprising the novel interpolymer in admixture with other polymers.

Interpolymers of acrylonitrile with monoethylenically unsaturated monomers copolymerizable therewith and blends of these polymers with one or more different acrylic polymers are known to be suitable for the manufacture of fibers having excellent properties for textile applications. One basic limitation on the usefulness of such polymers and polymer blends is their resistance to basic dyes.

Acrylonitrile polymers which have been prepared through the use of redox initiated polymerization techniques contain sulfonic acid and sulfato acid end groups on the polymer chain resulting from catalyst fragments. These groups assist dyeability to a small degree. However, the concentration of acid groups attached to the polymer resulting from catalyst fragments is found to be inversely proportional to the molecular weight of the polymer. Thus, the concentration of residual acidic groups in polymers having molecular weight in the fiber-forming range is too low to render the polymer attractive to adequate concentrations of basic dyestuffs which provide deep color shades necessary for a broad range of textile applications.

The basic dyeability of acrylonitrile polymers can be improved by interpolymerizing acrylonitrile with compounds having a free acid function such as acrylic acid, methacrylic acid, itaconic acid and the like. However, improvements of basic dyeability in the manner just described are usually obtained only by sacrificing color and heat stability of the polymers and fibers produced from them.

Another technique for enhancing the basic dyeability of fibers obtained from acrylic polymers can be accomplished by interpolymerization of alkenyl sulfonic acids or vinyl aromatic sulfonic acids (usually in the form of their water soluble salts). While the presence of such sulfonic acid groups increases the polymer affinity for basic dyestuffs, the utility of many known monomers for this purpose is diminished because they are difficult to incorporate along the polymer chains and because they tend to reduce conversion during polymerization.

It is an object of this invention to provide novel interpolymers of acrylonitrile having improved affinities for basic dyestuffs without sacrifice of polymer color and heat stability.

Another object of the invention is to provide novel interpolymers of acrylonitrile having improved affinities for basic dyestuffs whereby monomer incorporation into the polymer is efficient.

Then too, an object of the invention is to enhance the basic dye affinity of known polymers and fibers prepared therefrom by the provision of blends of known acrylic polymers with the novel interpolymers of this invention.

These and other objects of the invention are accomplished by interpolymerization of acrylonitrile with other monoethylenically unsaturated monomers copolymerizable therewith in the presence of a monomer having the formula

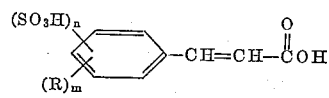

and water soluble alkali metal, alkaline earth metal and ammonium salts thereof wherein $n$ is an integrer from 1 to 2, $m$ is 0, 1 or 2 and R is a substituent selected from the group consisting of lower alkyl, halogen and hydroxyl.

Although vinyl monomers bearing negative groups on both aliphatically unsaturated carbon atoms normally interpolymerize with acrylonitrile only sparingly, the recited sulfocinnamic acid and derivatives thereof are surprisingly readily incorporated into the polymer chain and greatly increase the polymer affinity for basic dyes.

Moreover, interpolymerization of compounds such as sulfocinnamic acid does not adversely affect the heat stability of the polymers. Another unexpected property possessed by the interpolymers of this invention is that the concentrations of basic dyestuffs absorbed by fibers made from the polymers appear to be independent of pH variations below pH 7.

The interpolymers of this invention are prepared by interpolymerizing a mixture of monomers containing at least 85% by weight of acrylonitrile, up to 14.95% by weight of one or more different monoethylenically unsaturated monomers interpolymerizable therewith and from 0.05% to 2% by weight of a sulfocinnamic acid compound or water soluble salt thereof represented by the above recited formula.

The monolefinically unsaturated monomers copolymerizable therewith are exemplified by compounds such as methyl acrylate, ethyl acrylate, butyl acrylate, methoxymethyl acrylate, methyl methacrylate, α-chloroacrylic acid, vinyl chloride, vinylidene chloride, 1-chloro-1-bromo ethylene, methacrylonitrile, acrylamide, methacrylamide, α-chloroacrylamide, methyl vinyl ketone, vinyl acetate, vinyl chloroacetate, vinyl propionate, vinyl stearate, N-vinylimides, styrene, vinyl naphthalene, 2-methyl-5-vinylpyridine and other vinyl monomers known to those skilled in the art.

Examples of the sulfocinnamic acid compounds illustrated by the above recited formula are compounds such as:

β-(2-methyl-4-sulfophenyl)acrylic acid
β-(2-ethyl-4-sulfophenyl)acrylic acid
β-(2-isopropyl-4-sulfophenyl)acrylic acid
β-(2,3-dimethyl-4-sulfophenyl)acrylic acid
β-(2,3-diethyl-4-sulfophenyl)acrylic acid
β-(2-chloro-4-sulfophenyl)acrylic acid
β-(2,3-dichloro-4-sulfophenyl)acrylic acid
β-(2-hydroxy-4-sulfophenyl)acrylic acid
β-(3,4-disulfophenyl)acrylic acid Water soluble salts of these compounds such as the sodium and ammonium salts are desirably employed for purposes of polymerization.

Of the polymers falling within the scope of this invention those having p-sulfocinnamic acid interpolymerized are preferred because of availability of the monomer and high incorporation in the polymer molecule.

The polymers of this invention can be prepared using bulk, solution, suspension or aqueous emulsion techniques generally known in the art for vinyl polymerization. A preferred method involves the formation of an aqueous suspension of monomers and initiators at a pH of below 7. Free radical forming initiators such as peroxides, persulphates, perborates and the like can be employed. The preferred initiator is a redox system comprising a sulphoxy reducing agent such as sulphurous anhydride, sodium sulphite, magnesium suphite and bisulphite and equivalent sulphurous compounds wherein the sulfurous ion has a valence of 4 or less in combination with a catalyst having radicals such as persulfate, percarbonate, peroxy, and perborate. Polymerization is carried out by continuous, semi-continuous and batch polymerization techniques until polymers in the fiber-forming molecular weight range are formed at which time the polymerization is shortstopped. The polymer contents of the polymerization vessel are separated by filtration, then washed and dried.

The dried polymer can be dissolved in conventional organic solvents for acrylic polymers such as dimethylacetamide, dimethylformamide, dimethylsulfoxide and ethylene carbonate or, if desired, aqueous salt solution such as sodium thiocyanate, zinc chloride, lithium bromide and the like may be used. The polymer dopes or solutions may then be extruded to form filaments by wet or dry spinning techniques.

The basic dyeability of polyacrylonitrile or interpolymers containing at least about 85 weight percent of acrylonitrile and one or more monoethylenically unsaturated monomers copolymerizable therewith may be enhanced by blending therewith the above described dye receptive polymers of this invention. Where polymer blends are used in the manufacture of fibers, it is desirable to form separate polymer solutions in a common solvent and then admix the solution prior to spinning. Desirably, the weight of the acidic monomer unit based on the polymer blend is maintained at levels between 0.05 percent and 2.0 percent.

The improved affinity for basic dyes is illustrated in the following examples by dyeing the modified polymers of this invention at 100° C. for two hours with a dye solution containing about 7 grams per liter of dye. The quantity of dye fixed on the polymer is then measured spectrophotometrically.

*Examples 1-10*

A 3 liter polymerization vessel was continuously fed separate aqueous streams of catalyst ($K_2S_2O_8$) and activator ($SO_2$) containing 0.7 and 1.5 weight percent based on total monomer, respectively. The pH of the $SO_2$ stream was adjusted to about 3 by adding $NaHCO_3$. A stream containing 91 weight percent acrylonitrile and 9 weight percent of vinyl acetate was fed with a separate stream containing the sulfocinnamic acid monomer. Total water was fed at a rate of 2.3 liter/hr. and the total monomer fed was 0.5 liter/hr. The aqueous polymerizate was discharged through an overflow pipe and filtered to remove the polymer after which the polymers were washed with water, washed with acetone and then given another water wash prior to drying in an oven at 80° C. for 12 hrs.

The following determinations were carried out on the polymers thus obtained:

Conversion expressed as percent by weight of obtained polymer with respect to the weight of the introduced monomers.

Intrinsic viscosity $[\eta]$, calculated from relative viscosity determination, expressed in dl gm.$^{-1}$ from which was calculated the viscosity average molecular weight ($\overline{M}_v$) of the polymers using the formula of Cleland and Stockmayer: $[\eta]=2.33\times 10^{-4}\times M^{0.75}$. Relative viscosity is the viscosity of a solution of 0.1 gm. of the polymer in 100 ml. of dimethylformamide (DMF) divided by the viscosity of DMF, both measured at 25° C.

Basic dyeability expressed as the percent of polymer weight of commercial (purity about 18 percent) Sevron Blue 2G (C.I. Basic Blue 22) dye fixed by the polymer from a solution containing about 7 grams per liter of said dye at a liquor to polymer ratio of 40 to 1, a pH of 5.3 and a temperature of 100° C. over a 2 hour period.

Color of the polymers was measured by means of the integrating General Electric Recording Spectrophotometer.

Thermal stability was determined by heating the polymers for 8 hours at 145° C. The variation in color between the unheated polymers and heated polymers was measured by means of the integrating General Electric Recording Spectrophotometer.

The results of the determinations carried out for each polymer containing the various acid comonomers used for increasing the basic dyeability are recorded in the following table:

TABLE I

| Ex. No. | Acid Comonomer Used to Increase the Dyeability | Percent by Weight of Added Comonomer Based on Total Monomer | Conversion, Percent | Intrinsic Viscosity | Basic Dyeability in Percent of Sevron Blue 2G Fixed | Original Color of the Copolymer, Percent | | Thermal Stability of the Copolymer | |
|---|---|---|---|---|---|---|---|---|---|
| | | | | | | P | B | Δ P | Δ B |
| 1 | | | 70.2 | 1.54 | 11.8 | 98.3 | 93.4 | 12.5 | 14.6 |
| 2 | Acrylic acid | 0.5 | 63.8 | 1.60 | 14.2 | 98.2 | 94.5 | 15.1 | 16.0 |
| 3 | Itaconic acid | 0.45 | 68.2 | 1.60 | 16 | 98.1 | 94.6 | 14.9 | 16.2 |
| 4 | p-Methacrylamidobenzene sulfonic acid | 0.5 | 67.2 | 1.44 | 14.9 | 98.5 | 93.4 | 13.5 | 14.6 |
| 5 | p-Vinylbenzene sulfonic acid | 0.5 | 68.5 | 1.73 | 15.1 | 98.5 | 94.4 | 13.2 | 15.8 |
| 6 | p-Sulfocinnamic acid | 0.3 | 71.7 | 1.51 | 14.6 | 98.5 | 93.0 | 12.4 | 14.1 |
| 7 | do | 0.5 | 70.0 | 1.62 | 16.2 | 98.9 | 94.2 | 12.6 | 14.5 |
| 8 | do | 1 | 68.2 | 1.74 | 17.2 | 98.9 | 93.0 | 12.2 | 14.5 |
| 9 | do | 1.5 | 64.1 | 1.93 | 20.4 | 98.7 | 92.4 | 13.7 | 15.8 |
| 10 | do | 2 | 63.2 | 1.97 | 22.6 | 98.8 | 92.7 | 14.0 | 15.6 |

In the measurement of color the P (purity) gives the measure of how near the color shade is to the neutral color (white-grey-black axis of the color solid). The brightness B shows how near the color of the sample as reflectance of the incident light is to the white.

The polymers obtained according to Examples 1-10 were spun under identical conditions, from a solution of dimethylformamide by means of normal wet-spinning procedures into a spin bath composed of water and dimethylformamide. The fibers thus obtained were oriented by stretching, washed in water, dried and collapsed. The fibers were then subjected to the following determinations:

Color of the fiber: Measured by means of the integrating General Electric Recording Spectrophotometer Basic dyeability: Carried out by dyeing at 98° C.–100° C. for 3 hours, with a ratio bath/fiber of 50:1, by using the dye Red Astrazon BBL (C.I. Basic Red 14) and indicated as the maximum concentration of dye expressed as percent by weight on the fiber at which a complete exhaustion of the dye bath was obtained.

Variation of the dyeability of the fiber with the varying of pH of the dye bath in percent by weight of dye absorbed by the fiber.

The results of the determinations, carried out for each fiber, are reported in Table II.

nitrile and vinyl acetate were copolymerized in a ratio of 94 parts of acrylonitrile to 6 parts of vinyl acetate.

This polymer, 88 parts, was mixed with 12 parts of a copolymer composed of 50% of acrylonitrile and 50% of 2-methyl-5-vinylpyridine and was then wet-spun under the same conditions as in Example 12.

The fibers thus obtained have the properties recorded in Table IV.

TABLE III

| Added Acid Comonomer | Percent by Weight of Acid Added | Intrinsic Viscosity [η] | Conversion, Percent | Dyeability, Percent | Original Polymer Color | | Thermal Stability | |
|---|---|---|---|---|---|---|---|---|
| | | | | | P | B | Δ P | Δ B |
| Itaconic acid | 0.45 | 1.50 | 70.1 | 11.7 | 98.5 | 93.9 | 12.7 | 14.9 |
| Acrylic acid | 0.5 | 1.52 | 68.6 | 14.2 | 98.3 | 94.7 | 14.8 | 15.2 |
| Vinyl-benzene sulphonic acid | 0.5 | 1.57 | 68.5 | 14.1 | 98.2 | 94.6 | 14.7 | 14.9 |
| p-Sulfocinnamic acid | 0.5 | 1.54 | 68.4 | 14.6 | 98.1 | 94.5 | 13.8 | 15.1 |
| | 0.5 | 1.51 | 70.2 | 16.2 | 98.8 | 94.6 | 12.3 | 14.2 |

TABLE II

| Fiber Obtained by Using the Copolymer of Ex. No. | Color of the Fiber | | Dyeability Percent Dye on the Fiber Red Astrazon BBL | Percent of Dye Absorbed by the Fiber at pH | | |
|---|---|---|---|---|---|---|
| | P | B | | 3.2 | 4.3 | 5.4 |
| 1 | 95.3 | 79.5 | 3.9 | 3.8 | 3.8 | 3.9 |
| 2 | 94.8 | 78.5 | 4.2 | 3.6 | 4.1 | 4.2 |
| 3 | 94.7 | 78.2 | 5.0 | 4.2 | 4.6 | 5.0 |
| 4 | 94.8 | 78.7 | 4.3 | 3.7 | 3.1 | 4.3 |
| 5 | 94.9 | 78.9 | 4.0 | 3.5 | 3.8 | 4.0 |
| 6 | 95.7 | 79.8 | 4.5 | 4.4 | 4.4 | 4.5 |
| 7 | 95.0 | 79.3 | 5.1 | 4.9 | 4.9 | 5.1 |
| 8 | 95.0 | 79.1 | 8.2 | 7.9 | 8.0 | 8.2 |
| 9 | 94.9 | 79.0 | 10.1 | 9.9 | 10.0 | 10.1 |
| 10 | 94.8 | 79.0 | 12.1 | 11.8 | 12.0 | 12.1 |

TABLE IV

| Fibers Obtained According to the Example | Color of Fiber | | Percent absorbed: dye (Red Astrazon BBL) at pH 7 |
|---|---|---|---|
| | P | B | |
| 12 | 91.0 | 77.4 | 1.4 |
| 13 | 92.1 | 78.1 | 3.6 |

*Example 11*

Mixtures of monomers composed of 91% of acrylonitrile and of 9% of methyl acrylate, and an additional quantity of various acid comonomers introduced to increase the dyeability, were polymerized according to Example 1.

Under the standard polymerization conditions about 300 g./hr. of copolymer were obtained in which acrylonitrile and methyl acrylate are copolymerized in a ratio of 93 parts of acrylonitrile to 7 parts of methyl acrylate.

Results of determinations were made on the polymers as in Example 1 and are recorded in Table III.

*Example 12*

A mixture of monomer composed of 92% of acrylonitrile and 8% of vinyl acetate were polymerized according to Example 1.

Under the standard polymerization conditions above 300 g./hr. of polymer of acrylonitrile and vinyl acetate were copolymerized in a proportion of 94 parts of acrylonitrile to 6 parts of vinyl acetate.

A mixture of 88 parts of said polymer with 12 parts of a polymer of nearly of 50% of acrylonitrile and 50% of 2-methyl-2-vinylpyridine was dissolved in dimethylacetamide and spun acording to the wet-spinning described in Example 1. The fibers thus obtained gave the properties recorded in Table IV.

*Example 13*

To a mixture of monomers constituted of 92% of acrylonitrile and 8% of vinyl acetate was added 1% of p-sulfocinnamic acid based on the weight of the acrylonitrile/vinyl acetate mixture and this ternary mixture was polymerized according to Example 1.

Under the standard polymerization conditions above 300 g./hr. of polymer were obtained in which acrylo-

We claim:
1. A novel interpolymer comprising,
  (a) at least about 85 percent by weight of acrylonitrile,
  (b) from about 0.05 to about 2.0 percent by weight of a monomer selected from the group consisting of compounds represented by the formula

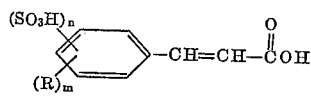

wherein $n$ is an integer from 1 to 2, $m$ is 0 to 2 and R is a substituent group selected from the group consisting of lower alkyl, halogen and hydroxyl and water soluble salts of said compounds and,
  (c) up to about 14.95 percent by weight of at least one other different monoethylenically unsaturated monomer interpolymerizable therewith.
2. The novel interpolymer of claim 1 wherein $n$ is 1 and $m$ is 0.
3. A fiber comprising the interpolymer of claim 1.
4. A novel polymer blend which comprises
  (a) the interpolymer of claim 1 and
  (b) at least one other polymer comprising in the absence of monomer (b) of claim 1 at least about 85 percent by weight of acrylonitrile and up to 15 percent by weight of at least one other monoethylenically unsaturated monomer copolymerizable therewith.
5. A fiber comprising the polymer blend of claim 4.
6. In a process for interpolymerization of acrylonitrile, the improvement which comprises contacting a mixture of said acrylonitrile in the presence of an initiator for vinyl polymerization with a monomer selected from the group consisting of compounds represented by the formula

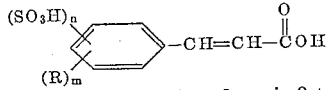

wherein $n$ is an integer from 1 to 2, $m$ is 0 to 2, and R is a substituent selected from the group consisting of lower alkyl, halogen and hydroxyl and water soluble salts thereof and at least one other different monoethylenically unsaturated monomer interpolymerizable therewith.

7. The improvement of claim 6 wherein $n$ is 1 and $m$ is 0.

References Cited

UNITED STATES PATENTS

| | | |
|---|---|---|
| 2,913,438 | 11/1959 | Davis et al. |
| 3,067,161 | 12/1962 | Roth. |
| 3,202,641 | 8/1965 | Nakajima et al. |
| 3,256,252 | 6/1966 | Kruckenberg et al. |

MURRAY TILLMAN, *Primary Examiner.*

J. WHITE, *Assistant Examiner.*